July 15, 1952        G. MERRILL        2,603,434
PILOTLESS AIRCRAFT
Filed Sept. 28, 1945        3 Sheets-Sheet 1
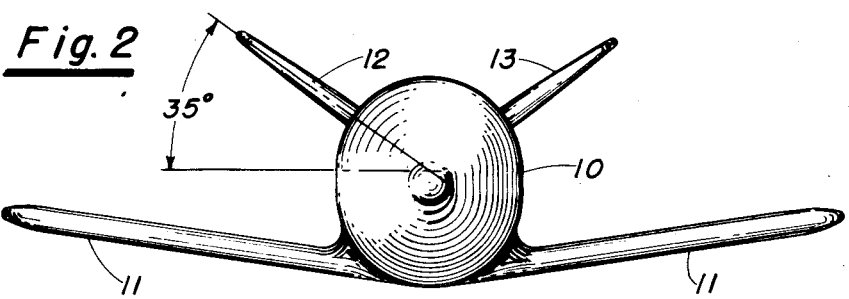
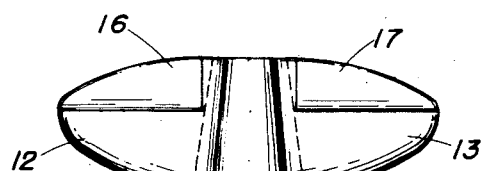
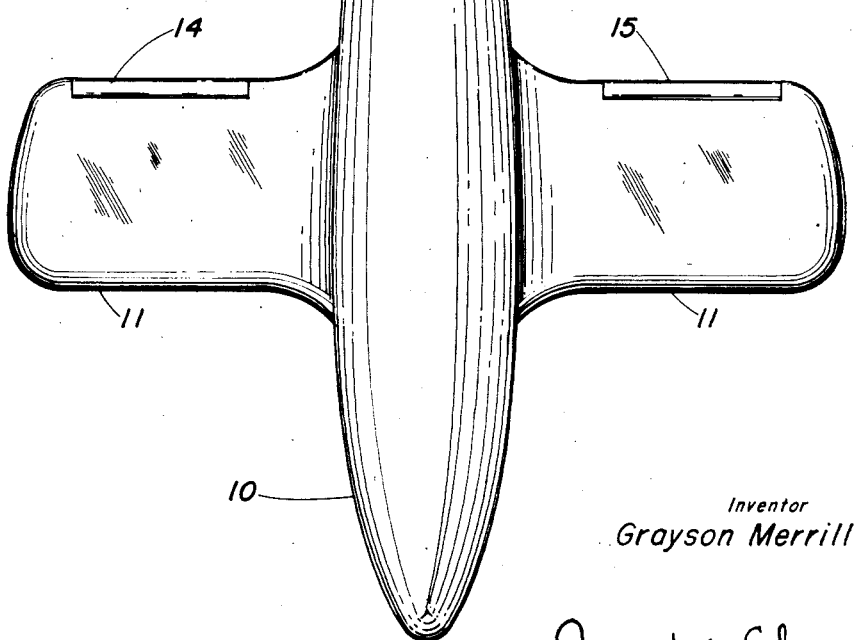
Inventor
Grayson Merrill
By Ralph L Chappell
Attorney

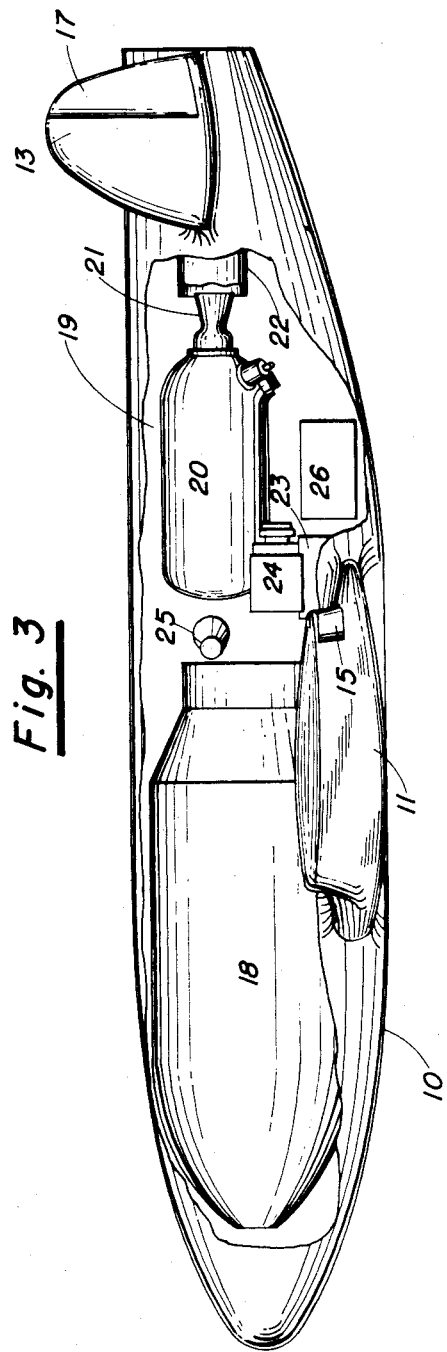

Patented July 15, 1952

2,603,434

UNITED STATES PATENT OFFICE 2,603,434

PILOTLESS AIRCRAFT

Grayson Merrill, United States Navy

Application September 28, 1945, Serial No. 619,267

2 Claims. (Cl. 244—14)

(Granted under the act of March 3, 1883, as amended April 30, 1928; 370 O. G. 757)

My invention relates to pilotless, rocket motor propelled aircraft arranged for automatic control by gyroscopic devices and for remote control in response to intelligence received from a remote point by radio.

The object of my invention is to provide a load carrying aircraft which may be carried by and launched from a parent aircraft, being adapted when in free flight, after launching from the parent aircraft, for pilotless self-control through contained gyroscopic stabilizing devices and for further control by radio signals transmitted from a remote point, such as from the parent aircraft.

Further features and objects of my invention will appear from the following description of the preferred embodiment taken in conjunction with the drawings and as set out with particularity in the appended claims.

In the drawings:

Fig. 1 is a plan view of the aircraft;

Fig. 2 is a front elevation of the aircraft;

Fig. 3 is a side elevation partially cut away to show the positioning of the load, the control devices, propulsion mechanism, and other elements.

Figure 4:
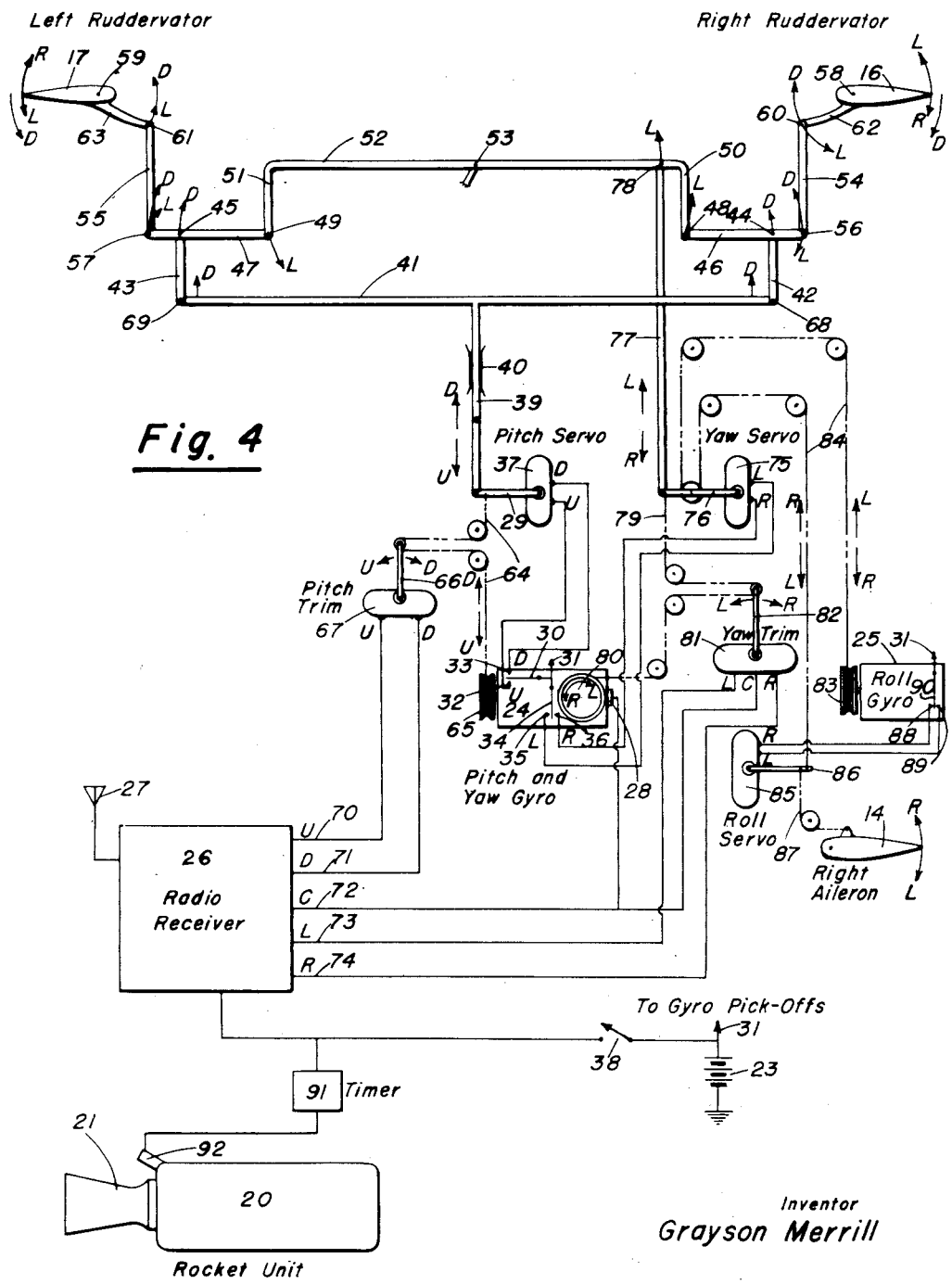
Fig. 4 is a diagrammatic presentation of a control system for use in the aircraft.

An aircraft according to my invention is generally shown in Figs. 1 and 2, comprising a fuselage 10 with attached wings 11 and fixed tail fins 12 and 13. Ailerons 14 and 15 are hinged to the trailing portions of the wings in a conventional manner. The tail fins 12 and 13 extend upwardly and outwardly from the fuselage at a dihedral angle of substantially 35°. The dihedral angle is defined as the acuate angle between a line perpendicular to the plane of symmetry and the projection of the axis of the airfoil on a plane perpendicular to the longitudinal axis of the aircraft. Rearwardly extending airfoils 16 and 17 are hinged to the fixed tail fins. The fixed portions are provided to replace both the horizontal and vertical fins provided on conventional aircraft, and the hinged after portions 16 and 17 to provide yaw and pitch control, replacing the rudders and elevators of conventional aircraft. Each of the hinged airfoils 16 and 17 will be hereinafter referred to as a ruddervator, this term being applied to an airfoil providing the combined controlling effects of a rudder and of an elevator.

As shown in the partially cut-away side elevation of Fig. 3, the fuselage 10 contains a bomb 18, which may be of a general purpose type as shown, or of an armor piercing, incendiary or any other desired type, disposed toward the forward or nose end. A propulsion unit 19 of the rocket jet type is mounted in the rearward portion of the fuselage and arranged to exhaust gases from the combustion of fuels contained in chamber 20 through rearwardly extending nozzle 21 to provide forward propelling thrust. The exhaust from the nozzle 21 is conducted through a tube 22 through the tail of the fuselage to the outside atmosphere. In the space within the fuselage immediately above the exhaust tube, a flare (not shown) may be provided, adapted to produce through a separate opening in the tail of the fuselage a trailing flame, desirable under certain conditions of use. Between the bomb and the rocket unit are disposed a battery 23, a pitch and yaw gyroscope 24, a roll gyroscope 25, and a radio receiver 26. The battery, gyroscopes and receiver constitute portions of a control system later described in connection with Fig. 4. Although not shown in Figs. 1, 2 or 3, control servomotors, trim motors, cables and lever systems, a radio receiving antenna, covered access openings in the fuselage, and hooks or other devices for attachment of the aircraft to a parent aircraft are provided. These, and such other small devices as may be required, may be readily placed in convenient positions by those skilled in the art.

It will be noted that landing gear is omitted since the aircraft of this invention is intended to be expendable and self-destructing upon detonation of the bomb 18. For test flights, however, when no bomb is carried, a parachute may be provided in the bomb space which will land the aircraft so as to permit recovery for further use.

The control system for the aircraft, diagrammatically presented in Fig. 4, consists of a conventional pitch and yaw gyroscope 24 which may be air operated by a vacuum Pitot tube system (not shown) in a known manner. An electric pick-off system is shown comprising a movable electric contactor 30 provided with power through conductor 31 from battery 23 and adapted to contact a stationary "up" contact 32 or a "down" contact 33 in accordance with the relative position of the gyroscopic rotor and the stabilization axis. A similar pick-off system is provided for left and right, or yaw, signals including movable contactor 34 and cooperating stationary left contact 35 and right contact 36. The movable contactors may be carried by the gimbals of the gyroscope in a known manner. An electrically operated caging mechanism indicated at 28 is provided for the gyroscope to permit caging of the rotor axis in both yaw and pitch simultaneously. Pitch servomotor 37 is electrically connected with contacts 32 and 33 to be energized for a selected rotation as determined by which of the pick-off contacts is closed, energy being provided from battery 23 through conductor 31, contactor 30 and selectively to contact 32 or 33 and thence to the servomotor. Rotation in one direction of servomotor arm 29, corresponding to clockwise in Fig. 4, serves to push rod 39 through a suitable guide 40 displacing rod 41 laterally, in the direction corresponding to arrows D on the drawing. The motion is transmitted through pivots 68 and 69 to rods 42 and 43 and through pivots 44 and 45 to levers 46 and 47, respectively. Levers 46 and 47 are pivoted at points 48 and 49, respectively, to rods 50 and 51 which are in turn connected firmly at their other ends to opposite ends of transverse lever 52 pivoted at its center 53 to a portion of the aircraft frame. Transverse lever 52 is held against motion about the center pivot 53 by a rod 71 pivoted to lever 52 toward one end, which remains stationary. Therefore, rods 50 and 51 do not move, and levers 46 and 47 are rotated equally about pivot points 48 and 49, respectively, because of the equal longitudinal motion of rods 42 and 43. Rods 54 and 55, being pivoted at pivot points 56 and 57 to levers 46 and 47, are moved in a primarily longitudinal direction to rotate the ruddervators 16 and 17 about their respective axes 58 and 59, in the direction in which the trailing edges of the ruddervators are moved downward and outward with respect to the aircraft, the motion of the rods 54 and 55 being transmitted through pivots 60 and 61 to arms 62 and 63, respectively, which are firmly attached to the ruddervators.

Closing the circuit to pick-off contact 32 of gyroscope 24 will result in opposite rotation of servomotor arm 29 (which would correspond to counterclockwise on the drawing). This motion would, through the linkage system described, rotate the ruddervators in a direction to move the trailing edges thereof upward and inward. It will be apparent that the lift component of the tail surfaces will be decreased in the upward direction by the upward and inward displacement of the trailing edges and that in flight, the aircraft pitch will be changed thereby toward increased climb. No effect on yaw will result, since the inward deflection of the two ruddervators will be equal and opposite.

An arm 29 of pitch servomotor 37 rotates in response to a down signal from gyroscope pickoff 33, follow-up cable 64 is pulled over suitable freeturning guide pulleys, unwinding from and rotating a reel 65, which comprises a pitch stabilization axis adjusting reel for gyroscope 24. The pitch stabilization axis may conveniently be determined by the position of stationary contacts 32 and 33 within the gyroscope case and, if so, these contacts may be adjusted in position within the case by rotation of reel 65. This method, or others known in the gyroscope art, may be employed. Pull on the cable 64 unwinds the cable from the reel, the reel in turn being effective through rotation in this direction to move contacts 32 and 33 to a new position in which contactor 30 is disengaged from contact 33. Upon disengagement, servomotor 37 stops, and reel 65 remains stationary until contact 32 or 33 is again energized to cause rotation of the arm 29. A follow-up system of this nature causes ruddervator displacement only to an extent bearing a predetermined relationship with the amount of displacement of the gyroscope case with respect to the gyroscope rotor. A pitch trim motor 67 with rotatable arm 66 which carries a free-turning pulley near its end, is provided to adjust the pitch control system through the follow-up system so as to permit changes in the angle of pitch to be maintained by the gyroscope. As shown in Fig. 4, a radio receiver 26 is provided in the aircraft which is adapted to complete a circuit from battery 23 and switch 38 to a selected one of five conductors, numbered 70 through 74 in response to the reception through antenna 27 of a radio frequency carrier wave to which the receiver has been tuned, the carrier being modulated by any one of five predetermined audible or super-audible frequencies. Five frequency discriminatory circuits in the output section of receiver 26, one for each of the five modulation frequencies, permit selective energization of the five conductors, 70 through 74. If, through reception of a properly modulated carrier, conductor 70 is energized, arm 66 of servomotor 67 is rotated in a direction (corresponding to counterclockwise in Fig. 4) such that the follow-up cable 64 strung over the pulley on arm 66 is pulled, or effectively shortened between arm 29 and reel 65. This results in reel rotation to unwind the cable and a readjustment of the stabilization axis in the direction characterized by movement of "up" contact 32 into contact with contactor 30 and corresponding movement of "down" contact 33 away from contactor 30. Thereafter the gyroscope will tend to maintain a new angle of greater climb (or less dive) as determined by the extent of movement of arm 66, which is in turn dependent upon the length of time the modulation causing energization of conductor 70 has been received. A reverse effect will result from reception of a carrier modulated to cause energization of conductor 71, which provides for adjustment of the stabilization axis such that the gyroscope will thereafter tend to maintain a greater angle of dive, or less climb.

Gyroscope 24 is arranged to control the yaw of the aircraft as well as the pitch. Pick-off contacts 35 and 36, in cooperation with contactor 34, provide energy, as determined by the horizontal direction of flight of the aircraft, selectively to the terminals of reversible yaw servomotor 75. Energy provided through contact 35, when the aircraft is flying to the right of the course to be maintained by the gyroscope, provides rotation of servomotor arm 76 in the direction corresponding to clockwise in the drawing. This rotation pushes rod 77, which is pivotally connected to arm 76, and the motion of rod 77 is transmitted through a pivot 78 to cause transverse lever 52 to rotate about its center pivot at 53 in a direction corresponding to counterclockwise in Fig. 4. Since rod 41 remains stationary, pivot points 44 and 45 will be moved only slightly, due to slight rotation of rods 42 and 43 about pivots 68 and 69, and levers 46 and 47 will be rotated about pivots 44 and 45 in the direction of rotation corresponding to clockwise in the drawing. Rods 54 and 55, through pivots 56 and 57, transmit the motion of levers 46 and 47 through pivots 60 and 61 and arms 62 and 63 to ruddervators 16 and 17, causing, in this case, upward and inward movement of the trailing edge of right ruddervator 16 and to a lesser extent downward and outward movement of the trailing edge of left ruddervator 17. The left ruddervator is affected less than the right because pivot points 45 and 49 and lever 47 are displaced in the direction of the longitudinal axis of lever 47 to a greater extent than occurs for pivots 44 and 48 and lever 46, as indicated in Fig. 4 by the arrows L from pivots 48 and 49. Also the angular positions of arms 62 and 63 with respect to the axes of the respective ruddervators tend to produce greater rotation for a given longitudinal motion of rods 54 and 55 when the motion is in the direction to move the trailing edge of the ruddervator in an upward and inward direction than when the motion produces movement of the trailing edge downward and outward. In actual practice, it has been found desirable to adjust the system, by adjustment of the lengths of and angles between the components, to provide an upward and inward displacement of the trailing edge of one ruddervator approximately twice the corresponding downward and outward displacement of the other in the accomplishment of turns.

It will be apparent from the description above when taken with Fig. 4 that a "left" signal from contact 35 produces a downward and outward displacement of the trailing edge of left ruddervator 17 and a corresponding but greater upward and inward displacement of the trailing edge of right ruddervator 16, and that conversely a "right" signal from contact 36 produces a downward and outward displacement of the trailing edge of the right ruddervator 16 and a corresponding but greater upward and inward displacement of the trailing edge of left ruddervator 17.

Attached to yaw servomotor arm 76 is a follow-up cable 79 adapted to adjust the yaw (azimuth direction) stabilization axis of gyroscope 24 through rotation of reel 80, this reel being effective to change the positions of pick-off contacts 35 and 36 with respect to the gyroscope case in a manner similar to the adjustment of the pitch stabilization axis through reel 65. It will be apparent that a yaw signal produced by the engagement of contactor 34 with either contact 35 or contact 36 is effective to rotate arm 76, and that this rotation is effective through follow-up cable 79 and reel 80 to move the contacts 35 and 36 toward the position in which neither contact is energized, resulting in stoppage of the servomotor as soon as arm 76 of the servomotor is rotated sufficiently to cause ruddervator displacement equivalent to a predetermined function of the displacement of the gyroscope case with respect to the gyroscope rotor, which displacement originally gave rise to the energizing signal applied to the servomotor. This method of operation is the substantial equivalent of that described in connection with pitch control by pick-off contacts 32 and 33, reel 65, follow-up cable 64, and servomotor 37. A yaw trim motor 81, with rotatable arm 82 carrying a free turning pulley for cooperation with follow-up cable 79, is provided for radio remote control adjustment to the yaw stabilization axis of the gyroscope 24. Accordingly energization of conductor 74 by the reception of a carrier modulated by the appropriate frequency will be effective to cause rotation of arm 82 in the direction to effectively shorten follow-up cable 79, corresponding to clockwise rotation of arm 82 as seen in the drawing. Shortening of the cable 79 causes unwinding of the cable on reel 80 and resultant adjustment of the position of contacts 35 and 36 in the direction to cause energization of contact 36 to provide a right turn signal to servomotor 75. Arm 76 of the servomotor rotates until follow-up cable 79 is effectively lengthened sufficiently to rewind on reel 80 far enough to return pick-off contacts 35 and 36 to the centered position in which neither is engaged by contactor 34, the ruddervators thereafter maintaining the right turn position until later signals are given by the gyroscope pick-off contacts. The yaw trim motor 81 may be centered to a predetermined position by energization of conductor 72, cam operated switches being provided as part of the motor operative to cause rotation in the proper direction until center position is reached.

In Fig. 4, arrows indicate the direction of motion of parts of the control system, and the electrical components to be excited, to accomplish right (R) and left (L) turns, up or climb (U) and dive (D) changes in pitch, and right (R) and left (L) roll of the aircraft, except that the arrows associated with follow-up cables 64, 79, and 84 indicate the direction in which these cables move in response to actuation of the control surfaces to produce the turn, change in pitch, or roll. It will be apparent that the use of a follow-up cable to initiate a control impulse requires that the follow-up cable must be moved in the direction opposite to that indicated by the arrow associated therewith. Thereafter, as the control surface is moved by operation of the appropriate servomotor, the follow-up cable will move in the direction indicated by the arrow to adjust the appropriate stabilization axis in the direction to remove the signal by centering the pick-off contacts with respect to the contactor.

It will be apparent that reels 65 and 80 of gyroscope 24 should be spring loaded in the direction to maintain follow-up cables 64 and 79 respectively in a taut condition. On roll gyroscope 25 the reel 83, which cooperates with roll follow-up cable 84, is similarly spring loaded to maintain cable 84 taut.

Roll control of the aircraft is accomplished through ailerons 14 and 15 arranged as shown in Fig. 1 for operation in a conventional manner by opposite and substantially equal deflections to provide the roll effects desired. Control of the ailerons is by means of a servomotor 85, as seen in Fig. 4, with rotatable arm 86 to which are attached suitable control cables. For the sake of clarity only one cable 87 is shown which controls right aileron 14, it being understood that the left aileron is similarly provided with a control cable from arm 86 arranged to cause deflection opposite to that of aileron 14. Roll gyroscope 25 is arranged to provide stabilizing signals through pick-off contacts 88 and 89, the position of which, with respect to the gyroscope case, determines the stabilization axis of the gyroscope. The stabilization axis is adjustable through rotation of reel 83. Contactor 90 is attached to a gimbal of the gyroscope rotor for cooperation with the pick-off contacts to provide energy from the battery 23 and conductor 31 to a selected one of the contacts in accordance with the relative orientation of the rotor and the stabilization axis of the gyroscope. The roll servomotor 85 is adapted for rotation in accordance with the pick-off contact energization to control the ailerons, the trailing edge of the right aileron 14 being moved upward to provide rightward roll of the aircraft in response to energization of contact 88 and resulting rotation of arm 86 in the direction to pull cable 87, which corresponds to counterclockwise rotation of the arm as shown in Fig. 4. This rotation of the arm is effective to pay out follow-up cable 84 over suitable free-turning pulleys and permit rewinding of the cable onto reel 83 which moves contacts 88 and 89 in the direction to disengage contact 88 from contactor 90 to stop the servomotor. Leftward roll control of the aircraft will result from engagement of contactor 90 with contact 89 causing rotation of the servomotor arm 86 in the direction to pay out cable 87.

In addition to maintaining the wings level in straight flight through the normal operation of the roll gyroscope, the system provides roll during turns. It will be seen that follow-up cable 84 is effectively lengthened or shortened, whenever yaw servomotor 75 is operated, through the free-turning pulley carried by arm 76 which is in cooperation with cable 84. Rotation of arm 76 in the direction to apply rightward yaw control to the ruddervators by pulling rod 77 will also effectively shorten follow-up cable 84 causing unwinding from reel 83 to adjust contacts 88 and 89 so as to reset the stabilization axis of gyroscope 25 in the orientation in which contact 88 will be closed to provide "up" right aileron deflection or rightward roll. The aileron is deflected until arm 86 of servomotor 85 has paid out cable 84 sufficiently to permit rewinding on reel 83 to re-establish the stabilization axis for disengagement of the pick-off contact 88 from contactor 90. It will be seen that the gyroscope 25 will serve thereafter to maintain an angle of roll in the direction of the turn proportional to the displacement of arm 76. The yaw servomotor is thereby made to perform, additionally, the functions of a roll trim motor to provide roll signals in accordance with the amount and direction of yaw-producing deflections of the ruddervators.

In addition to its functions of providing energization to pitch trim motor 67 through conductor 70 for climb control and conductor 71 for dive control, and to yaw trim motor 81 through conductor 73 for left and 74 for right turn control, the radio receiver 26 is arranged to energize a conductor 72, in response to reception of an appropriately modulated carrier, to cause trim motor 81 to return to centered position and to cage gyroscope 24 as to both yaw and pitch by energizing caging device 28.

The rocket unit provided for propulsion comprises a chamber 20 in which are two materials adapted to unite chemically to produce hot gases under high pressure which are allowed to escape through nozzle 21 to the atmosphere. The firing of the rocket unit is initiated by the provision of energy from battery 23 through switch 38 and a timer device 91 to an electrically operated igniter 92. Provision is made for closing switch 38 through a cord (not shown) or other suitable linkage at the time of release of the aircraft from the parent aircraft, the cord being conveniently connected to the parent aircraft so as to pull the switch closed upon separation of the two aircraft. Closure of the switch provides energization of the portion of the radio receiver 26 which selectively provides energy through conductors 70, 71, 72, 73 and 74 to the trim motors and the caging device of gyroscope 24 in response to remote radio signals as described. The amplifying and detector circuits of the receiver may be provided with energy from the battery directly through a conductor (not shown), rather than through switch 38, in order that the receiver will be instantly effective upon closure of switch 38 to provide control signals in case of the reception of a modulated carrier.

In typical operation, the aircraft, according to the invention, will be fastened underneath a parent aircraft by suitable hooks and cables in a quick-detachable manner. A cord is arranged to pull closed switch 38 upon separation of the carried aircraft from the parent aircraft, the cord being connected to the switch at one end and to the parent aircraft at the other. The parent aircraft with the other attached takes off and maneuvers as required until reaching a position sufficiently above and proximate to a desired target. During flight before release of the carried aircraft, the rotors of gyroscopes 24 and 25 will be brought up to effective rotating speed since the Pitot tube is effective to produce the necessary vacuum because of the airspeed of the parent and carried aircraft. The control airfoils may be deflected while the carried aircraft is attached to the parent aircraft by the normal action of the control system, but because of the relatively small size of the control airfoils of the carried aircraft with respect to those of the parent aircraft, there will be little interference with the normal maneuvering of the parent aircraft.

Upon release of the explosive-carrying aircraft into free flight and closure of switch 38, timer 91 is energized to provide a delay of the order of a few seconds in the ignition of the rocket unit to start the unit after a desired separation of the two aircraft has occurred, reducing the hazard of the exhaust gases from the rocket unit burning the parent aircraft. The rocket unit after ignition serves to rapidly increase the speed of the explosive-carrying aircraft. Timer 91 may also be connected to ignite the flare simultaneously with the rocket unit if the flare is needed, as it may be in night operations. The aircraft glides after release under the control of the gyroscopes. The rocket unit provides a high thrust, although the thrust may be of short duration. Rocket units now available that have proved most suitable for use in this invention, for instance, provide approximately 1000 pounds of thrust for approximately 10 seconds. It will be understood, however, that many factors must be considered in determining the size and type of rocket unit, including the size, weight and desired speed of the aircraft, the nature of the bombing operation, and the type of units available.

After release of the aircraft, its course may be adjusted, both in azimuth and angle of glide, by the transmission of a suitably modulated radio frequency carrier wave received on antenna 27. The length of time a carrier with a particular modulation is received determines the extent of the adjustment to the control system. Thus, if the signal received results in energization of conductor 70, trim motor 67 turns arm 66 in the direction to reset the pitch stabilization axis of gyroscope 24 to give climb signals to servomotor 37. The trim motor will continue to operate as long as the particular modulation is received, causing the stabilization axis to be further and further displaced with increasing resultant climb deflection of the ruddervators. When the reception ceases, the gyroscope will tend to maintain the new attitude of flight of the aircraft as established by the new setting of the pitch stabilization axis. Return to an increased dive attitude may be accomplished subsequently by operation of the trim motor 67 in the opposite direction through energization of conductor 71.

If it is desired to alter the course of the aircraft in azimuth, as for instance toward the left, a carrier wave is transmitted modulated with the proper frequency to cause the receiver to energize conductor 73. Trim motor arm 82 rotates in the direction to effectively lengthen follow-up cable 79, resulting in rotation of reel 80 in the direction (corresponding to counterclockwise as shown in Fig. 4) to adjust the yaw stabilization axis of gyroscope 24 in the direction to give left turn indications to servomotor 75 through pick-off contact 35. The servomotor operates to apply ruddervator deflection for a left turn and to effectively shorten follow-up cable 79 until the stabilization axis of the gyroscope is again in neutral position with respect to the rotor and gimbals, stopping the servomotor. The stabilization axis of roll gyroscope 25 is simultaneously affected by the effective lengthening of follow-up cable 84 to provide, through servomotor 85 and the ailerons, a roll proportioned to the extent of ruddervator deflection. It will be understood that the rate of turn of the aircraft is determined by the extent of ruddervator deflection and that this is determined by the duration of the reception of the properly modulated carrier since the duration of the reception controls the degrees of rotation accomplished by the yaw trim motor arm 82 and the resultant amount of reorientation of the yaw stabilization axis of the gyroscope 24. The desired turn is accordingly accomplished at a rate determined by the operator of the remote transmitter who continues the transmission of the modulated carrier until the desired rate of turn is effective. As the aircraft approaches the desired direction, the operator causes the carrier to be transmitted modulated with the predetermined frequency for energizing conductor 72. Current through this conductor is effective to cage the rotor of gyroscope 24 and simultaneously to cause yaw trim motor 81 to return to a centered position. When the transmission of the carrier is stopped, the gyroscope will be immediately uncaged and will operate thereafter to maintain the azimuthal direction, as well as the pitch, in which the aircraft is flying at the moment of uncaging. As previously explained, roll gyroscope 25 is operative to maintain the aircraft level as to roll whenever yaw servomotor 75 is centered, the condition which exists when the ruddervators are not in a right or left turn position.

In the manner described, it is intended that the operator, who may be conveniently located together with the remote control transmitter in the parent aircraft, should control the explosive-carrying aircraft into collision with a desired target. Upon collision, the bomb will explode since it will normally be provided with an impact detonator. It is contemplated that radio remote control detonation may also be used if desired.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. In an aerial missile, comprised of a fuselage and supporting airfoils and adapted to be carried and released by an air plane, a control system comprising two pivoted airfoils extending upwardly and outwardly from opposite sides of said fuselage at dihedral angles of substantially thirty-five degrees, a yaw servomotor adapted for operation under the control of a yaw pick-off device of a first gyroscope, a linkage system operable by said yaw servomotor to simultaneously pivot one of said two airfoils upwardly and inwardly and the other of said two airfoils outwardly and downwardly to effect yaw control of said missile, a pitch servomotor adapted for operation under the control of a pitch pick-off device of said first gyroscope, said linkage system being operable by said pitch servomotor to pivot both of said airfoils in the same direction to effect pitch control of said missile, downward and outward pivoting of said airfoils being effective to control the flight attitude toward increased dive, and upward and inward pivoting being effective to control the flight attitude toward increased climb, a roll servomotor operatively connected to pivoted ailerons and adapted for operation under the control of a roll pick-off device of a second gyroscope, a yaw follow-up connection from said yaw servomotor adapted to adjust said yaw pick-off device in response to operation of said yaw servomotor, a pitch follow-up connection from said pitch servomotor adapted to adjust said pitch pick-off device in response to operation of said pitch servomotor, a yaw trim motor adapted for excitation from a radio remote control receiver and in cooperative relationship with said yaw follow-up connection to adjust said yaw pick-off device, a pitch trim motor adapted for excitation from said receiver and in cooperative relationship with said pitch follow-up connection to adjust said pitch pick-off device, and a roll follow-up connection from said roll servomotor adapted to adjust said roll pick-off device in response to operation of said roll servomotor, said roll follow-up connection being in cooperative relationship with said yaw servomotor to adjust said roll pick-off device in response to operation of said yaw servomotor.

2. In an aerial missile comprised of a fuselage, supporting airfoils and a jet propulsion device and adapted to be carried and released by an airplane, a control system comprising two pivoted airfoils extending upwardly and outwardly from opposite sides of said fuselage at dihedral angles of substantially thirty-five degrees, a yaw servomotor adapted for operation under the control of a yaw pick-off device of a first gyroscope, a linkage system operable by said yaw servomotor to simultaneously pivot one of said two airfoils upwardly and inwardly and the other of said two airfoils outwardly and downwardly to effect yaw control of said missile, a pitch servomotor adapted for operation under the control of a pitch pick-off device of said first gyroscope, said linkage system being operable by said pitch servomotor to pivot both of said airfoils in the same direction to effect pitch control of said missile, downward and outward pivoting of said airfoils being effective to control the flight attitude toward increased dive, and upward and inward pivoting being effective to control the flight attitude toward increased climb, a roll servomotor operatively connected to pivoted ailerons and adapted for operation under the control of a roll pick-off device of a second gyroscope, a yaw follow-up connection from said yaw servomotor adapted to adjust said yaw pick-off device in response to operation of said yaw servomotor, a pitch follow-up connection from said pitch servomotor adapted to adjust said pitch pick-off device in response to operation of said pitch servomotor, a yaw trim motor adapted for excitation from a radio remote control receiver and in cooperative relationship with said yaw follow-up connection to adjust said yaw pick-off device, a pitch trim motor adapted for excitation from said receiver and in cooperative relationship with said pitch follow-up connection to adjust said pitch pick-off device, a roll follow-up connection from said roll servomotor adapted to adjust said roll pick-off device in response to operation of said roll servomotor, said roll follow-up connection being in cooperative relationship with said yaw servomotor to adjust said roll pick-off device in response to operation of said yaw servomotor, a time delay device, and means for simultaneously energizing an operative portion of said radio remote control receiver and said time delay device upon separation of said missile from said airplane, said time delay device being operable to start said jet propulsion device a predetermined time after separation.

GRAYSON MERRILL.

REFERENCES CITED

The following references are of record in the file of this patent:

UNITED STATES PATENTS

| Number | Name | Date |
|---|---|---|
| 1,376,192 | Dye | Apr. 26, 1921 |
| 1,792,937 | Sperry | Feb. 17, 1931 |
| 2,201,174 | Harding et al. | May 21, 1940 |
| 2,207,709 | Bates | July 16, 1940 |
| 2,225,002 | Focke | Dec. 17, 1940 |
| 2,253,508 | Crane et al. | Aug. 26, 1941 |
| 2,339,011 | Gurney | Jan. 11, 1944 |
| 2,372,184 | Carlson | Mar. 27, 1945 |
| 2,397,088 | Clay | Mar. 26, 1946 |

FOREIGN PATENTS

| Number | Country | Date |
|---|---|---|
| 524,865 | Great Britain | Aug. 16, 1940 |